United States Patent
Sathath

(10) Patent No.: US 8,041,387 B2
(45) Date of Patent: *Oct. 18, 2011

(54) INFORMATION PROCESSING APPARATUS

(75) Inventor: Anwar Sathath, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/949,737

(22) Filed: Nov. 18, 2010

(65) Prior Publication Data

US 2011/0065397 A1   Mar. 17, 2011

Related U.S. Application Data

(63) Continuation of application No. 12/558,455, filed on Sep. 11, 2009, now Pat. No. 7,860,529.

(30) Foreign Application Priority Data

Dec. 24, 2008 (JP) .................. 2008-328711

(51) Int. Cl.
H04M 1/00 (2006.01)
(52) U.S. Cl. ................ 455/553.1; 455/550.1; 455/552.1
(58) Field of Classification Search ............. 455/73, 455/550.1, 552.1, 553.1, 101, 102, 103, 132, 455/168.1, 180.1, 188.1
See application file for complete search history.

(56) References Cited

U.S. PATENT DOCUMENTS

| 5,953,641 | A | 9/1999 | Auvray |
| 6,574,489 | B1 | 6/2003 | Uriya |
| 6,609,010 | B1 | 8/2003 | Dolle et al. |
| 7,860,529 | B2 * | 12/2010 | Sathath ............ 455/553.1 |
| 2002/0177465 | A1 | 11/2002 | Robinett |
| 2003/0144026 | A1 | 7/2003 | Hirota et al. |
| 2003/0193923 | A1 | 10/2003 | Abdelgany et al. |
| 2004/0224644 | A1 | 11/2004 | Wu et al. |
| 2005/0193419 | A1* | 9/2005 | Lindstrom et al. ............ 725/71 |
| 2006/0160564 | A1* | 7/2006 | Beamish et al. ........... 455/553.1 |
| 2007/0232239 | A1 | 10/2007 | Der et al. |
| 2007/0275660 | A1 | 11/2007 | Sathath |
| 2008/0261650 | A1 | 10/2008 | Piriyapoksombut et al. |
| 2008/0316369 | A1* | 12/2008 | Yamamoto et al. ........... 348/725 |
| 2009/0081976 | A1* | 3/2009 | Fujii et al. ................ 455/209 |
| 2009/0239488 | A1 | 9/2009 | Gushiken |
| 2010/0056075 | A1* | 3/2010 | Rakshani et al. ............ 455/77 |

FOREIGN PATENT DOCUMENTS

| JP | 10-190505 | 7/1998 |
| JP | 11-196340 | 7/1999 |
| JP | 2002-151928 | 5/2002 |
| JP | 2006-245803 | 9/2006 |

* cited by examiner

Primary Examiner — Andrew Wendell

(74) Attorney, Agent, or Firm — Knobbe, Martens, Olson & Bear LLP

(57) ABSTRACT

According to one embodiment, an information processing apparatus includes a main body, a display unit rotatably attached to the main body via a coupling portion, first and second antennas provided in the display unit, a first mixing/distributing device provided in the display unit, first and second wireless communication modules provided in the main body, and a second mixing/distributing device provided in the main body. The signal transmission/reception between the first mixing/distributing device in the display unit and the second mixing/distributing device in the main body is executed via a cable which is inserted in the coupling portion.

8 Claims, 11 Drawing Sheets

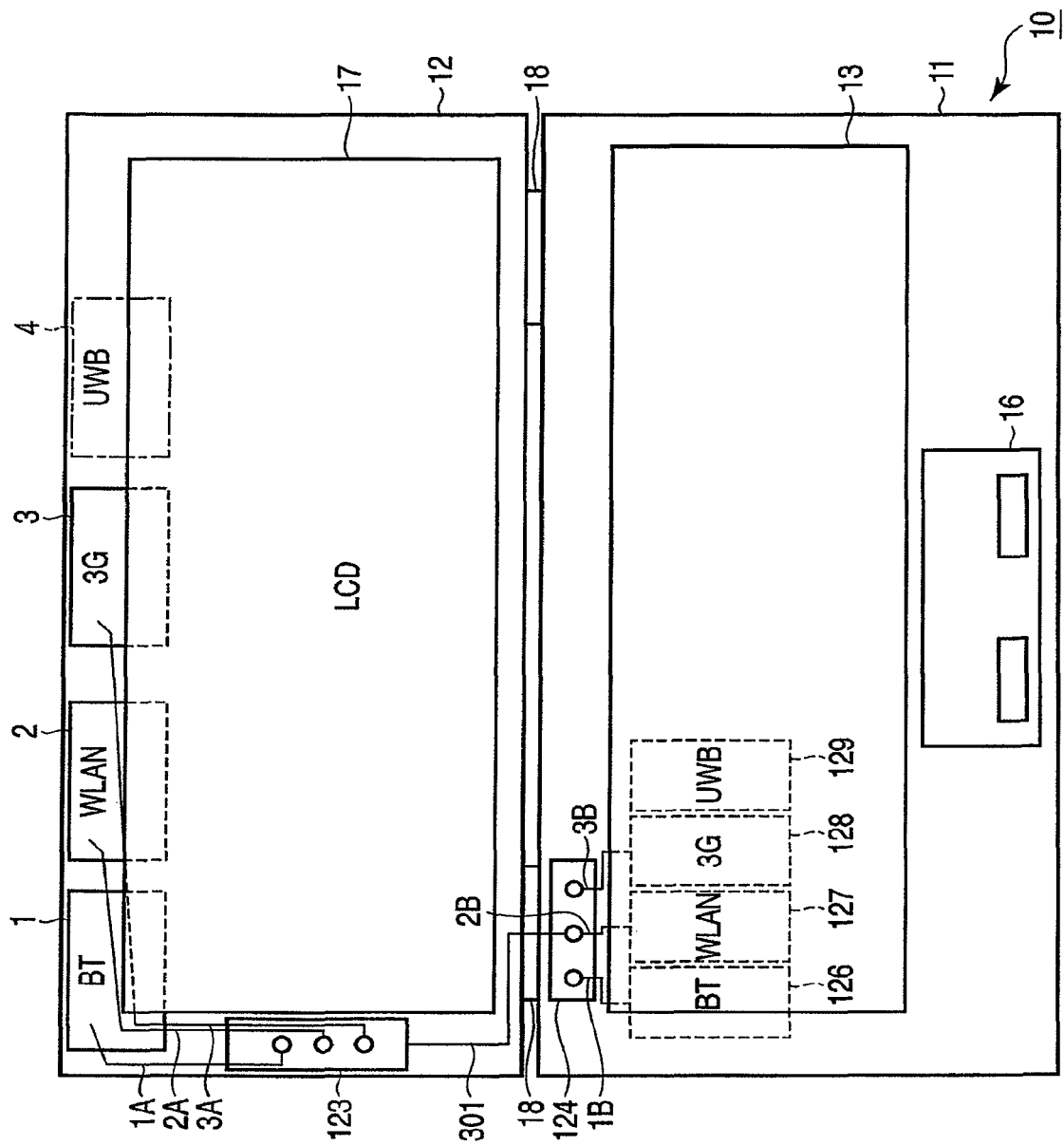
F I G. 3

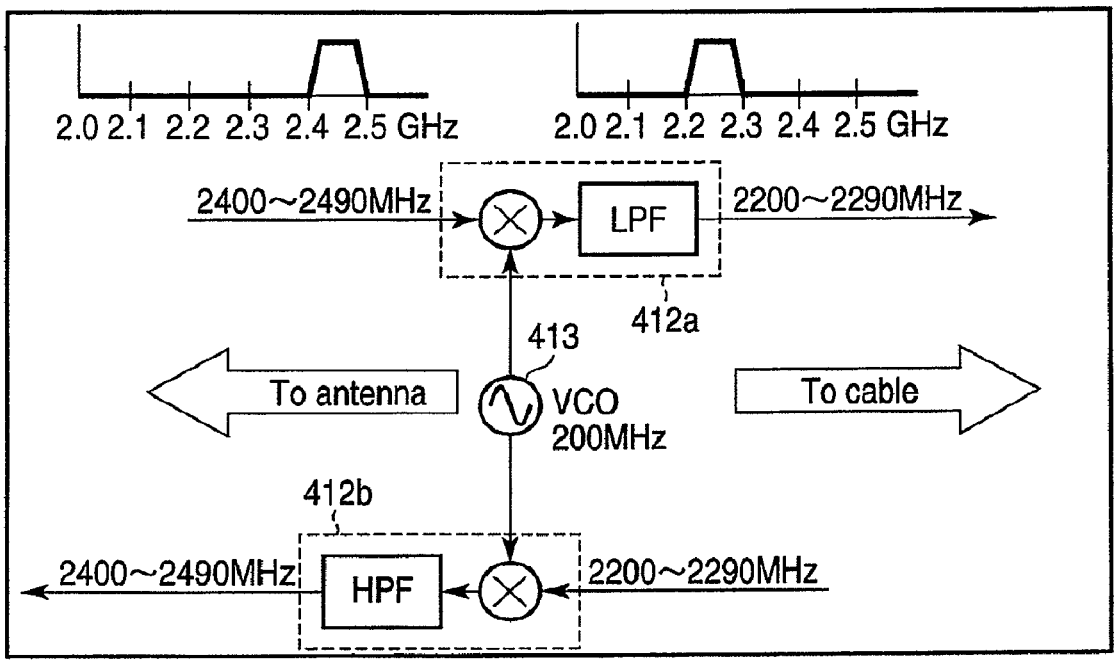
F I G. 4
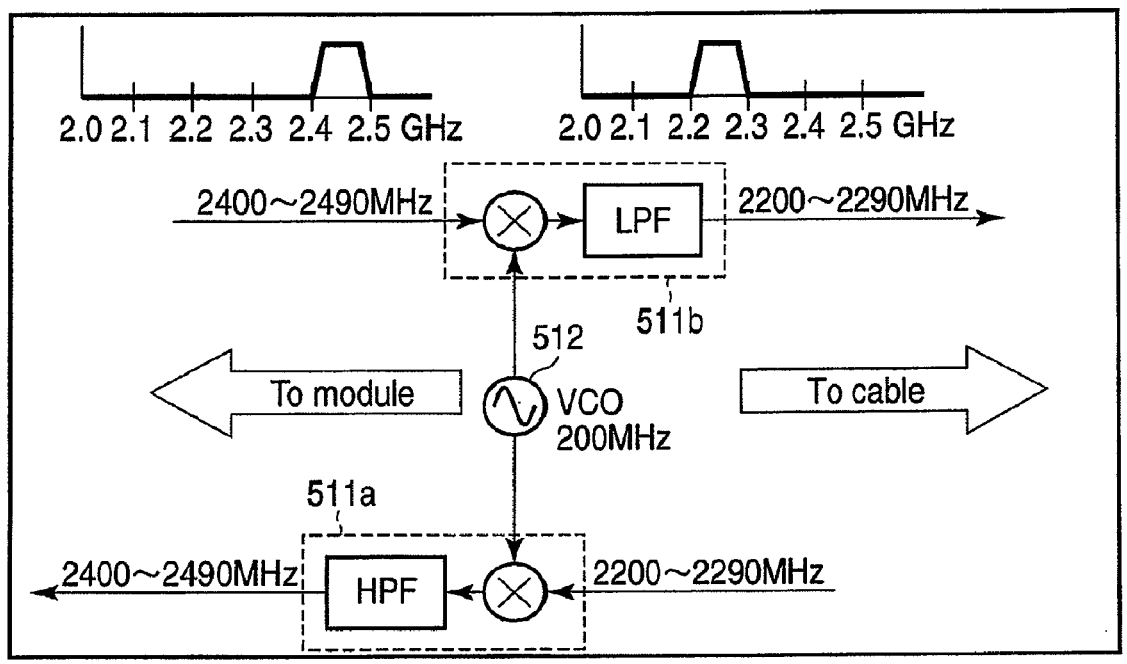
F I G. 5

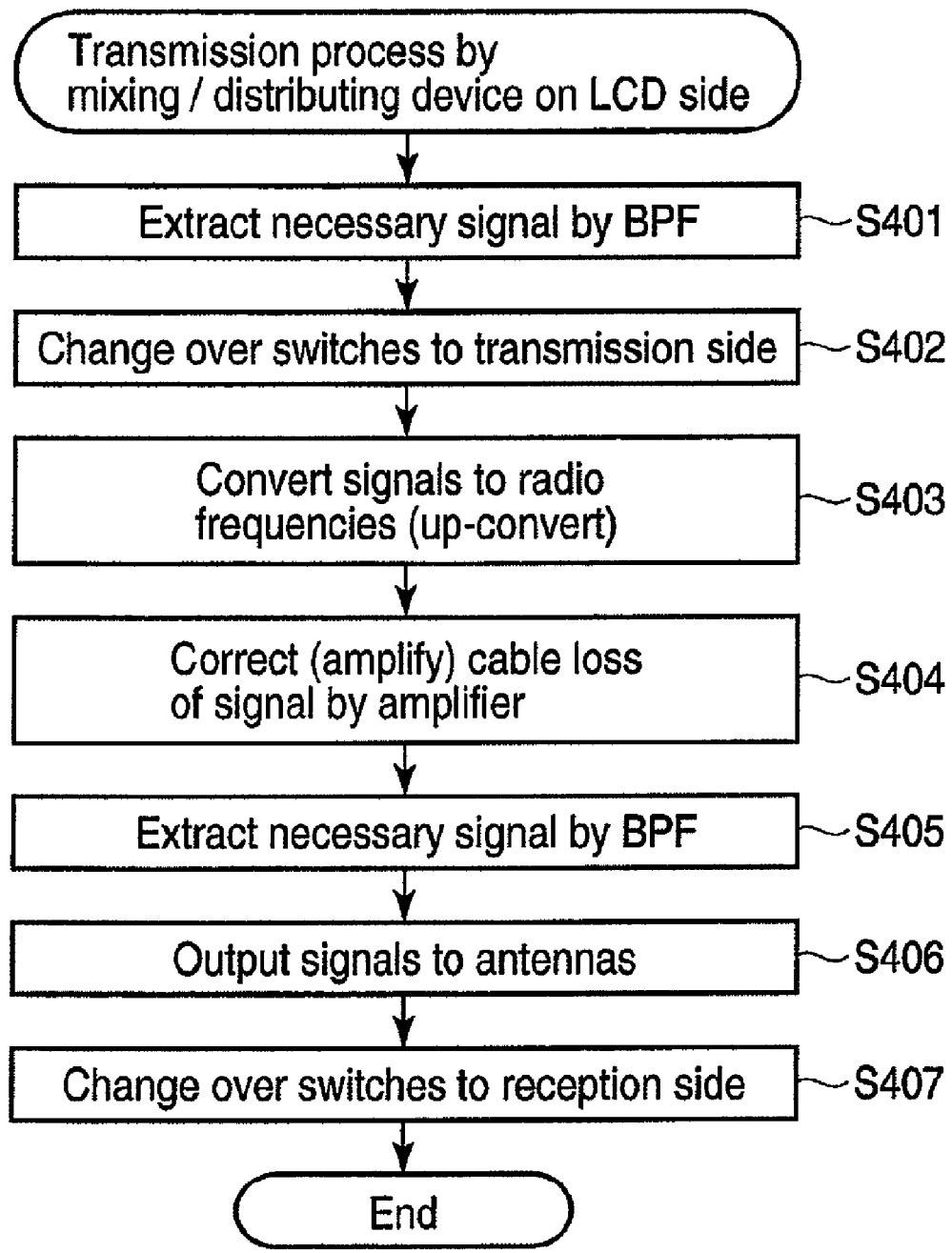
F I G. 1 1

INFORMATION PROCESSING APPARATUS

CROSS-REFERENCE TO RELATED APPLICATIONS

This application is a continuation of U.S. patent application Ser. No. 12/558,455 filed Sep. 11, 2009, which is based upon and claims the benefit of priority from Japanese Patent Application No. 2008-328711, filed Dec. 24, 2008, the entire contents of both of which are incorporated herein by reference.

BACKGROUND OF THE INVENTION

1. Field of the Invention

One embodiment of the invention relates to an information processing apparatus, such as a personal computer, which has an antenna.

2. Description of the Related Art

In recent years, various portable personal computers of a notebook type, etc., have been developed. The personal computer of this type includes a wireless communication function for executing wireless communication with an external device.

With recent wide use of various wireless communication systems, there has been a demand that a plurality of kinds of wireless communication modules, which correspond to a plurality of kinds of wireless communication systems, be mounted in the portable personal computer.

In the case where the notebook personal computer is equipped with a wireless communication function, it is usually necessary to provide an antenna, a wireless communication module and a cable for connecting the antenna and the wireless communication module. Thus, in order to equip the personal computer with a plurality of kinds of wireless communication functions, it is necessary to dispose antennas, wireless communication modules and cables, which correspond to the respective wireless communication functions, in the personal computer. However, since the space within the personal computer is limited, it is possible that the kinds of wireless communication functions, which can be provided in the personal computer, are limited.

Jpn. Pat. Appln. KOKAI Publication No. H11-196340 discloses a satellite signal receiving system wherein a satellite broadcast signal is converted to a satellite broadcast intermediate-frequency signal, a satellite communication signal is converted to a satellite communication intermediate-frequency signal, the frequency band of which is different from the frequency band of the satellite broadcast intermediate-frequency signal, and these intermediate-frequency signals are mixed and can be transmitted via a single cable.

In the satellite signal receiving system of Jpn. Pat. Appln. KOKAI Publication No. H11-196340, the satellite broadcast signal and the satellite communication signal, which are reception signals, are frequency-converted, mixed, and transmitted via a single cable. The mixed intermediate-frequency signal is separated and demodulated by a reception tuner which is provided in the satellite signal receiving system.

On the other hand, the transmission and reception of signals are performed by a wireless communication module and an antenna, which are provided in a portable personal computer, or the like. Thus, both a reception signal and a transmission signal need to be sent via a single cable. In addition, it is necessary to supply the wireless communication module and antenna with not an intermediate-frequency transmission/reception signal but a radio-frequency transmission/reception signal.

Therefore, there is a demand for the realization of a novel function for simultaneously transmitting transmission/reception signals of a plurality of kinds of wireless communication systems via a single cable.

BRIEF DESCRIPTION OF THE DRAWINGS

A general architecture that implements the various feature of the invention will now be described with reference to the drawings. The drawings and the associated descriptions are provided to illustrate embodiments of the invention and not to limit the scope of the invention.

FIG. 3 is an exemplary view showing a configuration of a wireless communication system which is provided in the information processing apparatus according to the embodiment;

FIG. 4 is an exemplary block diagram for explaining a frequency conversion process in the information processing apparatus according to the embodiment;

FIG. 5 is another exemplary block diagram for explaining the frequency conversion process in the information processing apparatus according to the embodiment;

FIG. 11 is an exemplary flow chart illustrating the procedure of a transmission process by an LCD-side mixing/distributing device which is provided in the information processing apparatus according to the embodiment;

DETAILED DESCRIPTION OF THE PREFERRED EMBODIMENT

Various embodiments according to the invention will be described hereinafter with reference to the accompanying drawings. In general, according to one embodiment of the invention, there is provided an information processing apparatus comprising: a main body; a display unit rotatably attached to the main body via a coupling portion; first and second antennas provided in the display unit; a first mixing/ distributing device provided in the display unit, and configured to convert a reception signal of a first frequency band that is input from the first antenna to a reception signal of a second frequency band, to output the reception signal of the second frequency band and a reception signal of a third frequency band that is input from the second antenna to a cable which is inserted in the coupling portion, to input from the cable a transmission signal of the second frequency band and a transmission signal of the third frequency band, to convert the input transmission signal of the second frequency band to a transmission signal of the first frequency band, to output the transmission signal of the first frequency band to the first antenna, and to output the input transmission signal of the third frequency band to the second antenna; first and second wireless communication modules provided in the main body; and a second mixing/distributing device provided in the main body, and configured to convert a transmission signal of the first frequency band which is input from the first wireless communication module to a transmission signal of the second frequency band, to output to the cable the transmission signal of the second frequency band and a transmission signal of the third frequency band which is input from the second wireless communication module, to input from the cable the reception signal of the second frequency band and the reception signal of the third frequency band, to convert the input reception signal of the second frequency band to a reception signal of the first frequency band, to output the reception signal of the first frequency band to the first wireless communication module, and to output the reception signal of the third frequency band to the second wireless communication module.

Figure 1:
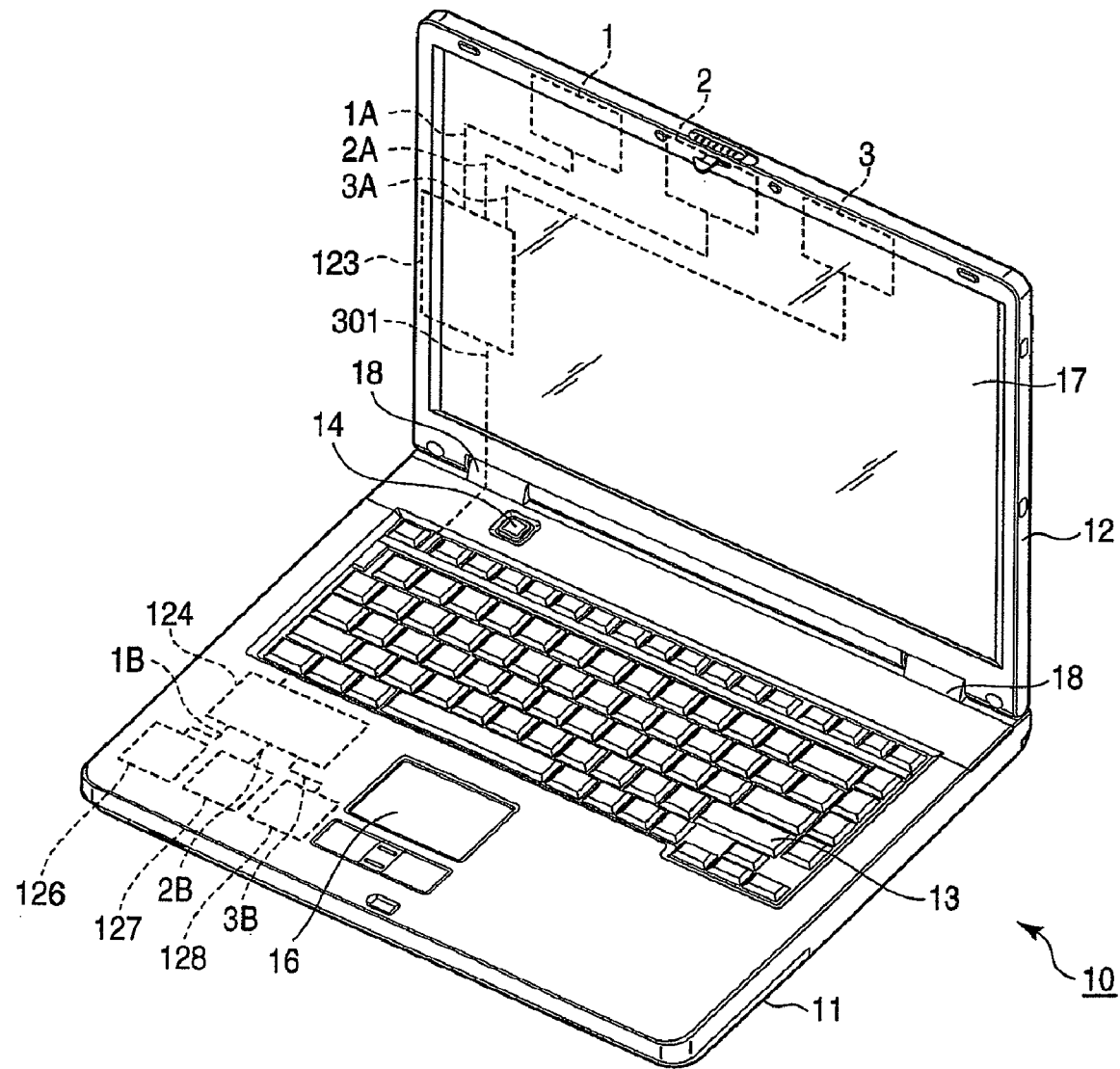
FIG. 1 is an exemplary perspective view showing the external appearance of an information processing apparatus according to an embodiment of the invention.

FIG. 1 shows the external appearance of an information processing apparatus according to the embodiment of the invention. The information processing apparatus is realized as a battery-powerable portable personal computer 10.

FIG. 1 is a perspective view of the computer 10 in the state in which a display unit of the computer 10 is opened. The computer 10 comprises a computer main body 11 and a display unit 12. A display device, which is composed of an LCD (Liquid Crystal Display) 17, is built in the display unit 12. The display screen of the LCD 17 is disposed on an approximately central part of the display unit 12. In the display unit 12, there are provided an antenna 1, an antenna 2, an antenna 3 and a mixing/distributing device 123. The antenna 1, antenna 2 and antenna 3 correspond to different wireless communication systems. Each of the antennas is configured to cover the frequency band which is used in the associated wireless communication system. The antenna 1, antenna 2 and antenna 3 are connected to associated ports (antenna terminals) of the mixing/distributing device 123 via a cable 1A, a cable 2A and a cable 3A, respectively.

The display unit 12 is rotatably attached to the computer main body 11 via hinge portions 18. The hinge portions 18 are coupling portions which couple the display unit 12 to the computer main body 11. Specifically, the display unit 12 is supported by the hinge portions 18 which are disposed on a rear end portion of the computer main body 11. The display unit 12 is attached to the computer main body 11 via the hinge portions 18 so as to be rotatable between an open position where the top surface of the computer main body 11 is exposed and a closed position where the top surface of the computer main body 11 is covered with the display unit 12.

The computer main body 11 is a base unit having a thin box-shaped casing. A keyboard 13, a power button 14 for powering on/off the computer 10 and a touch pad 16 are disposed on the top surface of the computer main body 11. In the computer main body 11, there are provided a system board (also referred to as "motherboard") on which various electronic components are disposed, a mixing/distributing device 124, a wireless communication module 126, a wireless communication module 127 and a wireless communication module 128.

The wireless communication module 126 is a wireless communication module which executes wireless communication with an external device according to a wireless communication system such as Bluetooth (trademark). The wireless communication module 126 is connected, for example, to a bus slot which is provided on the system board. In Bluetooth (BT), a frequency band of 2.4 GHz to 2.5 GHz is used. In the case where the wireless communication module 126 is realized as a wireless communication module (BT module) which executes wireless communication according to the Bluetooth standard, the wireless communication module 126 executes wireless communication by using a radio-frequency signal which belongs to a frequency band of 2.4 GHz to 2.5 GHz. The wireless communication module 126 is connected to an associated port (antenna terminal) of the mixing/distributing device 124 via a cable 1B such as a coaxial cable.

The wireless communication module 127 is a wireless communication module which executes wireless communication with an external device according to a wireless communication system such as wireless LAN (WLAN). The wireless communication module 127 is connected, for example, to a bus slot which is provided on the system board. In the wireless LAN (WLAN), for example, a frequency band of 2.4 GHz to 5.74 GHz is used. In the case where the wireless communication module 127 is realized as a wireless communication module (WLAN module) which executes wireless communication according to the wireless LAN (WLAN) standard, the wireless communication module 127 executes wireless communication by using a radio-frequency signal which belongs to the frequency band of 2.4 GHz to 5.74 GHz. The wireless communication module 127 is connected to an associated port (antenna terminal) of the mixing/distributing device 124 via a cable 2B such as a coaxial cable.

The wireless communication module 128 is a wireless communication module which executes wireless communication with an external device according to, e.g. a third generation mobile communication system (3G). The wireless communication module 128 is connected, for example, to a bus slot which is provided on the system board. In the third generation mobile communication system (3G), a frequency band of 1.92 GHz to 2.17 GHz, for instance, is used. In the case where the wireless communication module 128 is realized as a wireless communication module (3G module) which executes wireless communication according to the third generation mobile communication system (3G), the wireless communication module 128 executes wireless communication by using a radio-frequency signal which belongs to a frequency band of 1.92 GHz to 2.17 GHz. The wireless communication module 128 is connected to an associated port (antenna terminal) of the mixing/distributing device 124 via a cable 3B such as a coaxial cable.

The wireless communication module 126, wireless communication module 127 and wireless communication module 128 execute wireless communication by using the antenna 1, antenna 2 and antenna 3, respectively. The antenna 1 covers the frequency band of 2.4 GHz to 2.5 GHz, the antenna 2 covers the frequency band of 2.4 GHz to 5.74 GHz, and the antenna 3 covers the frequency band of 1.92 GHz to 2.17 GHz.

In the description below, a pair consisting of a wireless communication module and an associated antenna (e.g. wireless communication module 126 and antenna 1) is referred to as "wireless sub-system".

The antennas 1 to 3 are disposed, for example, at an upper end portion within the display unit 12. By disposing the antennas 1 to 3 at the upper end portion within the display unit 12, each of the wireless communication module 126, wireless communication module 127 and wireless communication module 128 can execute wireless communication with the external device in the state in which the antennas 1 to 3 are disposed at a relatively high position.

The mixing/distributing device 123 within the display unit 12 is connected to the mixing/distributing device 124 within the computer main body 11 via a single cable 301. Signal transmission/reception between the mixing/distributing device 123 within the display unit 12 and the mixing/distributing device 124 within the computer main body 11 is executed via the single cable 301. The cable 301 is passed through the space within the hinge portion 18. The cable 301 is, for instance, a coaxial cable. The cable 301 is led out from the computer main body 11 to the display unit 12 via the hinge portion 18.

In the description below, a radio-frequency signal, which is output from the wireless communication module, 126 to 128, and is transmitted to the outside of the personal computer 10 with use of the antenna, 1 to 3, is referred to as "transmission signal". A radio-frequency signal, which is received from the outside of the personal computer 10 via the antenna, 1 to 3, and is input to the wireless communication module, 126 to 128, is referred to as "reception signal".

The mixing/distributing device 123 within the display unit 12 mixes reception signals which are input from the antenna 1, antenna 2 and antenna 3, and outputs the mixed reception signal to the mixing/distributing device 124 within the computer main body 11 via the cable 301. The mixing/distributing device 124 within the computer main body 11 distributes the mixed reception signal, which is input from the mixing/distributing device 123 within the display unit 12 via the cable 301, to the wireless communication module 126, wireless communication module 127 and wireless communication module 128.

The mixing/distributing device 124 within the computer main body 11 mixes transmission signals which are input from the wireless communication module 126, wireless communication module 127 and wireless communication module 128, and outputs the mixed signal to the mixing/distributing device 123 within the display unit 12 via the cable 301. The mixing/distributing device 123 within the display unit 12 distributes the mixed transmission signal, which is input from the mixing/distributing device 124 within the computer main body 11 via the cable 301, to the antenna 1, antenna 2 and antenna 3.

Figure 2:
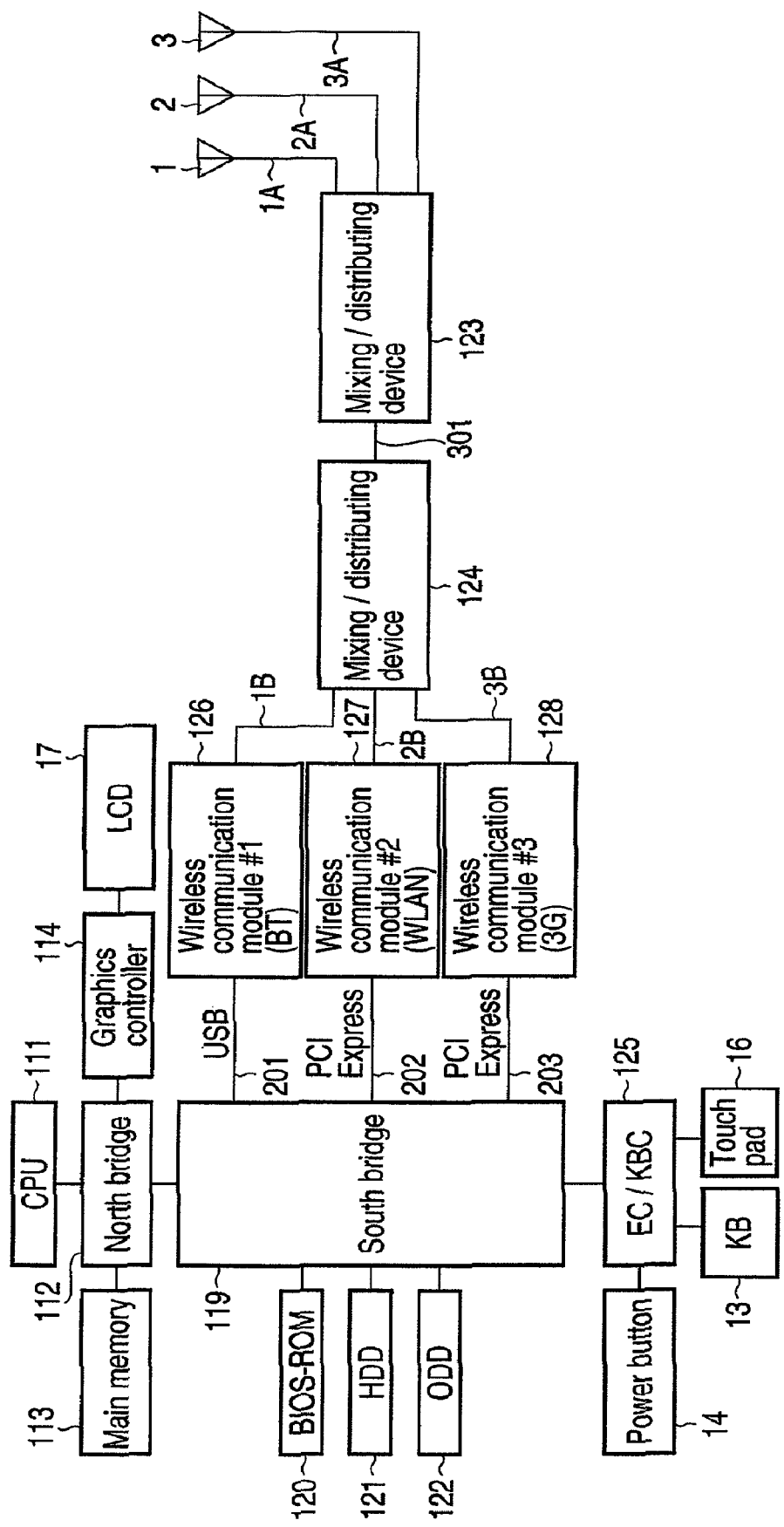
FIG. 2 is an exemplary block diagram showing the system configuration of the information processing apparatus according to the embodiment.

Next, referring to FIG. 2, the system configuration of the computer 10 is described.

The computer 10 comprises a CPU 111, a north bridge 112, a main memory 113, a graphics controller 114, a south bridge 119, a BIOS-ROM 120, a hard disk drive (HDD) 121, an optical disc drive (ODD) 122, mixing/distributing devices 123 and 124, wireless communication module 126, wireless communication module 127, wireless communication module 128, an embedded controller/keyboard controller IC (EC/KBC) 125, and antennas 1 to 3.

The CPU 111 is a processor which controls the operation of the computer 10. The CPU 111 executes an operating system (OS) and various application programs, which are loaded from the hard disk drive (HDD) 121 into the main memory 113. The CPU 111 also executes a system BIOS (Basic Input/Output System) that is stored in the BIOS-ROM 120. The system BIOS is a program for hardware control.

The north bridge 112 is a bridge device which connects a local bus of the CPU 111 and the south bridge 119. In addition, the north bridge 112 has a function of executing communication with the graphics controller 114 via, e.g. an AGP (Accelerated Graphics Port) bus.

The graphics controller 114 is a display controller which controls the LCD 17 that is used as a display monitor of the computer 10.

The south bridge 119 is a bridge device which controls various I/O devices. The wireless communication module 126 is connected to the south bridge 119 via a bus 201 such as a USB (Universal Serial Bus). The wireless communication module 127 is connected to the south bridge 119 via a bus 202 such as a PCI bus or a PCI Express bus. In addition, the wireless communication module 128 is connected to the south bridge 119 via a bus 203 such as a PCI bus or a PCI Express bus.

The wireless communication module 126, wireless communication module 127 and wireless communication module 128 are connected to the mixing/distributing device 124 via the cable 1B, cable 2B and cable 3B. Specifically, each of the wireless communication module 126, wireless communication module 127 and wireless communication module 128 includes an antenna terminal for transmission/reception of a radio-frequency signal (RF signal). The antenna terminal of the wireless communication module 126 is connected to the mixing/distributing device 124 via the cable 1B. The antenna terminal of the wireless communication module 127 is connected to the mixing/distributing device 124 via the cable 2B. The antenna terminal of the wireless communication module 128 is connected to the mixing/distributing device 124 via the cable 3B.

The mixing/distributing device 124 is connected to the mixing/distributing device 123 via the cable 301. The antenna 1, antenna 2 and antenna 3 are connected to the mixing/distributing device 123 via the cable 1A, cable 2A and cable 3A, respectively.

The embedded controller/keyboard controller IC (EC/KBC) 125 is a 1-chip microcomputer in which an embedded controller for power management and a keyboard controller for controlling the keyboard (KB) 13 and touch pad 16 are integrated.

Next, referring to FIG. 3, the operations of the respective components in the wireless communication are described.

To begin with, a description is given of the case where signals are transmitted from the wireless communication modules 126 to 128.

The wireless communication module (BT module) 126, wireless communication module (WLAN module) 127 and wireless communication module (3G module) 128 output transmission signals according to the standards of the Bluetooth (BT), wireless LAN (WLAN) and third generation mobile communication system (3G), respectively.

The transmission signal which is output from the wireless communication module 126 is input to the mixing/distributing device 124 via the cable 1B. The transmission signal which is output from the wireless communication module 127 is input to the mixing/distributing device 124 via the cable 2B. The transmission signal which is output from the wireless communication module 128 is input to the mixing/distributing device 124 via the cable 3B.

The mixing/distributing device 124 converts the radio frequencies (radio transmission bands) of the respective input transmission signals to intermediate frequencies of mutually different bands, respectively. Specifically, the mixing/distributing device 124 converts the respective transmission signals of radio frequencies to transmission signals of intermediate frequencies at which no interference occurs between the transmission signals. Then, the mixing/distributing device 124 mixes the frequency-converted transmission signals and outputs the mixed transmission signal to the mixing/distributing device 123 via the cable 301.

The mixing/distributing device 123 separates the mixed transmission signal, which is received from the mixing/distributing device 124. The mixing/distributing device 123 converts ("deconvert") each separated transmission signal from the intermediate frequency to the radio frequency. In other words, the mixing/distributing device 123 restores the transmission signals, which are the outputs from the wireless communication modules 126 to 128, from the transmission signal which has been received from the mixing/distributing device 124. The mixing/distributing device 123 outputs the transmission signal by the BT module 126, the transmission signal by the WLAN module 127 and the transmission signal by the 3G module 128 to the antenna 1, antenna 2 and antenna 3, respectively.

Next, a description is given of the case where signals are received by the antennas 1 to 3.

The antenna 1, antenna 2 and antenna 3 receive reception signals which are based on the standards of the Bluetooth (BT), wireless LAN (WLAN) and third generation mobile communication system (3G), respectively.

The reception signal from the antenna 1 is input to the mixing/distributing device 123 via the cable 1A. The reception signal from the antenna 2 is input to the mixing/distributing device 123 via the cable 2A. The reception signal from the antenna 3 is input to the mixing/distributing device 123 via the cable 3A.

The mixing/distributing device 123 converts the radio frequencies (radio transmission bands) of the respective input reception signals to intermediate frequencies of mutually different bands. Specifically, the mixing/distributing device 123 converts the respective reception signals of radio frequencies to reception signals of intermediate frequencies at which no interference occurs between the reception signals. Then, the mixing/distributing device 123 mixes the frequency-converted reception signals and outputs the mixed reception signal to the mixing/distributing device 124 via the cable 301.

The mixing/distributing device 124 separates the mixed reception signal, which is received from the mixing/distributing device 123. The mixing/distributing device 124 converts ("deconvert") each separated reception signal from the intermediate frequency to the original radio frequency. In other words, the mixing/distributing device 124 restores the reception signals, which are the outputs from the antennas 1 to 3 from the reception signal which has been received from the mixing/distributing device 123. The mixing/distributing device 124 outputs the reception signal by the antenna 1, the reception signal by the antenna 2 and the reception signal by the antenna 3 to the BT module 126, the WLAN module 127 and the 3G module 128, respectively.

In the meantime, the computer 10 may additionally be provided with, for example, a wireless communication module 129 and an antenna 4 for wireless communication based on the UWB (ultra wideband) standard. In this case, the wireless communication module 129 is connected to the mixing/distributing device 124, and the antenna 4 is connected to the mixing/distributing device 123. In the present embodiment, by establishing such connections, the computer 10 can easily be equipped with a larger number of kinds of wireless communication functions.

The radio-frequency signals of the wireless communication modules, which are frequency-converted by the mixing/distributing device 123 or mixing/distributing device 124, have such a relationship that at least a part of the frequency band of a certain radio-frequency signal overlaps the frequency band of another radio-frequency signal. The mixing/distributing device 123 or mixing/distributing device 124 converts at least one of the radio-frequency signals to a predetermined frequency band which is so determined as not to overlap the other frequency band. For example, the frequency band of 2.4 GHz to 2.5 GHz of the radio-frequency signal of the BT module 126 partly overlaps the frequency band of 2.4 GHz to 5.74 GHz of the radio-frequency signal of the WLAN module 127. Thus, the mixing/distributing device 123 or mixing/distributing device 124 down-converts, for example, the radio-frequency signal of the BT module 126 to a frequency band of 2.2 GHz to 2.3 GHz which does not overlap the frequency band of the radio-frequency signal of the WLAN module 127.

It is not always necessary to convert all radio-frequency signals (reception signals, transmission signals) of the BT module 126, WLAN module 127 and 3G module 128 to intermediate frequencies. For example, only the frequency of the radio-frequency signal (reception signal, transmission signal) corresponding to the BT module 126 may be converted to a predetermined frequency band which does not overlap the frequency bands of the radio-frequency signals corresponding to the WLAN module 127 and 3G module 128.

As the cable length between each wireless communication module and the associated antenna corresponding to each wireless communication module becomes greater, the loss of the radio-frequency signal which is transmitted over the cable, i.e. a so-called cable loss, becomes greater. It is thus preferable that the mixing/distributing device 124, as shown in FIG. 3, be disposed at a position near the rear end portion within the main body 11, to be more specific, at a position near the hinge portion 18 in which the cable 301 is inserted. As shown in FIG. 3, in the case where the cable 301 is inserted in the hinge portion 18 which is provided on the left end side of the rear end portion within the main body 11, the mixing/distributing device 123 is disposed, for example, at a position near the left end portion within the display unit 12.

FIG. 4 shows an example in which the transmission signal and reception signal are frequency-converted by the mixing/distributing device 123 which is provided in the display unit 12. FIG. 4 shows a part of the mixing/distributing device 123, which is composed of a frequency converter 412a comprising a multiplier (also referred to as "mixer") and a low-pass filter (LPF), a frequency converter 412b comprising a multiplier (also referred to as "mixer") and a high-pass filter (HPF), and a voltage-controlled oscillator (VCO) 413 functioning as a local oscillator. In this example, it is assumed that the transmission signal and reception signal are radio-frequency signals which are based on, e.g. the Bluetooth standard.

To begin with, a description is given of an example in which the mixing/distributing device 123 frequency-converts the reception signal with a frequency band of 2400 to 2490 MHz, which is received by the antenna 1.

The multiplier of the frequency converter 412a multiplies ("mixing") the reception signal of 2400 to 2490 MHz, which is input from the antenna 1, by a signal of 200 MHz which is input from the VCO 413. As a result, a signal of a sideband frequency of 2600 to 2690 MHz and a signal of a sideband frequency of 2200 to 2290 MHz are generated. The LPF of the frequency converter 412a filters these signals of the two sideband frequencies, and extracts the low-frequency side signal of 2200 to 2290 MHz.

By the above-described process, the mixing/distributing device 123 frequency-converts the reception signal of 2400 to 2490 MHz to the signal of 2200 to 2290 MHz. The frequency band of 2200 to 2290 MHz is a frequency band which overlaps neither the wireless LAN frequency band nor the 3G frequency band.

Next, a description is given of an example in which the mixing/distributing device 123 frequency-converts the transmission signal with a frequency band of 2200 to 2290 MHz, which has been frequency-converted by the mixing/distributing device 124 on the computer main body 11 side.

The multiplier of the frequency converter 412b multiplies ("mixing") the transmission signal of 2200 to 2290 MHz, which has been frequency-converted by the mixing/distributing device 124, by a signal of 200 MHz which is input from the VCO 413. As a result, a signal of a sideband frequency of 2400 to 2490 MHz and a signal of a sideband frequency of 2000 to 2090 MHz are generated. The HPF of the frequency converter 412b filters these signals of the two sideband frequencies, and extracts the high-frequency side signal of 2400 to 2490 MHz.

By the above-described process, the mixing/distributing device 123 frequency-converts the transmission signal of 2200 to 2290 MHz to the signal of 2400 to 2490 MHz.

FIG. 5 shows an example in which the transmission signal and reception signal are frequency-converted by the mixing/distributing device 124 which is provided in the computer main body 11. FIG. 5 shows a part of the mixing/distributing device 124, which is composed of a frequency converter 511a comprising a multiplier and a high-pass filter (HPF), a frequency converter 511b comprising a multiplier and a low-pass filter (LPF), and a voltage-controlled oscillator (VCO) 512. In this example, it is assumed that the transmission signal and reception signal are radio-frequency signals which are based on, e.g. the Bluetooth standard.

To begin with, a description is given of an example in which the mixing/distributing device 124 frequency-converts the reception signal with a frequency band of 2200 to 2290 MHz, which has been frequency-converted by the mixing/distributing device 123 on the display unit 12 side.

The multiplier of the frequency converter 511a multiplies ("mixing") the reception signal of 2200 to 2290 MHz, which has been frequency-converted by the mixing/distributing device 123, by a signal of 200 MHz which is input from the VCO 512. As a result, a signal of a sideband frequency of 2400 to 2490 MHz and a signal of a sideband frequency of 2000 to 2090 MHz are generated. The HPF of the frequency converter 511a filters these signals of the two sideband frequencies, and extracts the high-frequency side signal of 2400 to 2490 MHz.

By the above-described process, the mixing/distributing device 124 frequency-converts the reception signal of 2200 to 2290 MHz to the signal of 2400 to 2490 MHz.

Next, a description is given of an example in which the mixing/distributing device 124 frequency-converts the transmission signal with a frequency band of 2400 to 2490 MHz, which has been input from the wireless communication module 126.

The multiplier of the frequency converter 511b multiplies ("mixing") the transmission signal of 2400 to 2490 MHz, which is input from the wireless communication module 126, by a signal of 200 MHz which is input from the VCO 512. As a result, a signal of a sideband frequency of 2600 to 2690 MHz and a signal of a sideband frequency of 2200 to 2290 MHz are generated. The LPF of the frequency converter 511b filters these signals of the two sideband frequencies, and extracts the low-frequency side signal of 2200 to 2290 MHz.

By the above-described process, the mixing/distributing device 124 frequency-converts the transmission signal of 2400 to 2490 MHz to the signal of 2200 to 2290 MHz.

Figure 6:
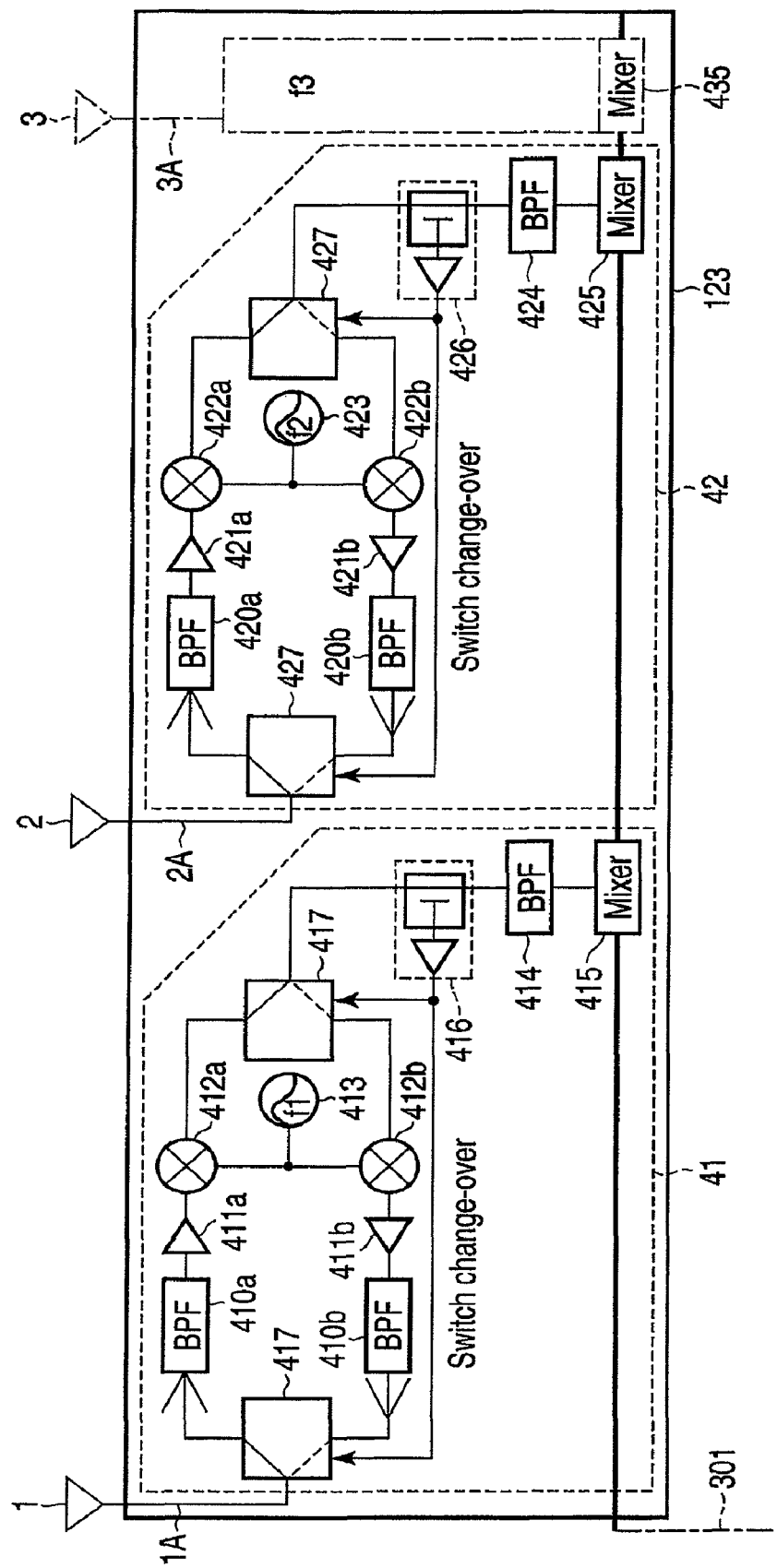
FIG. 6 is an exemplary circuit diagram showing a mixing/distributing device which is provided in the information processing apparatus according to the embodiment.
Figure 7:
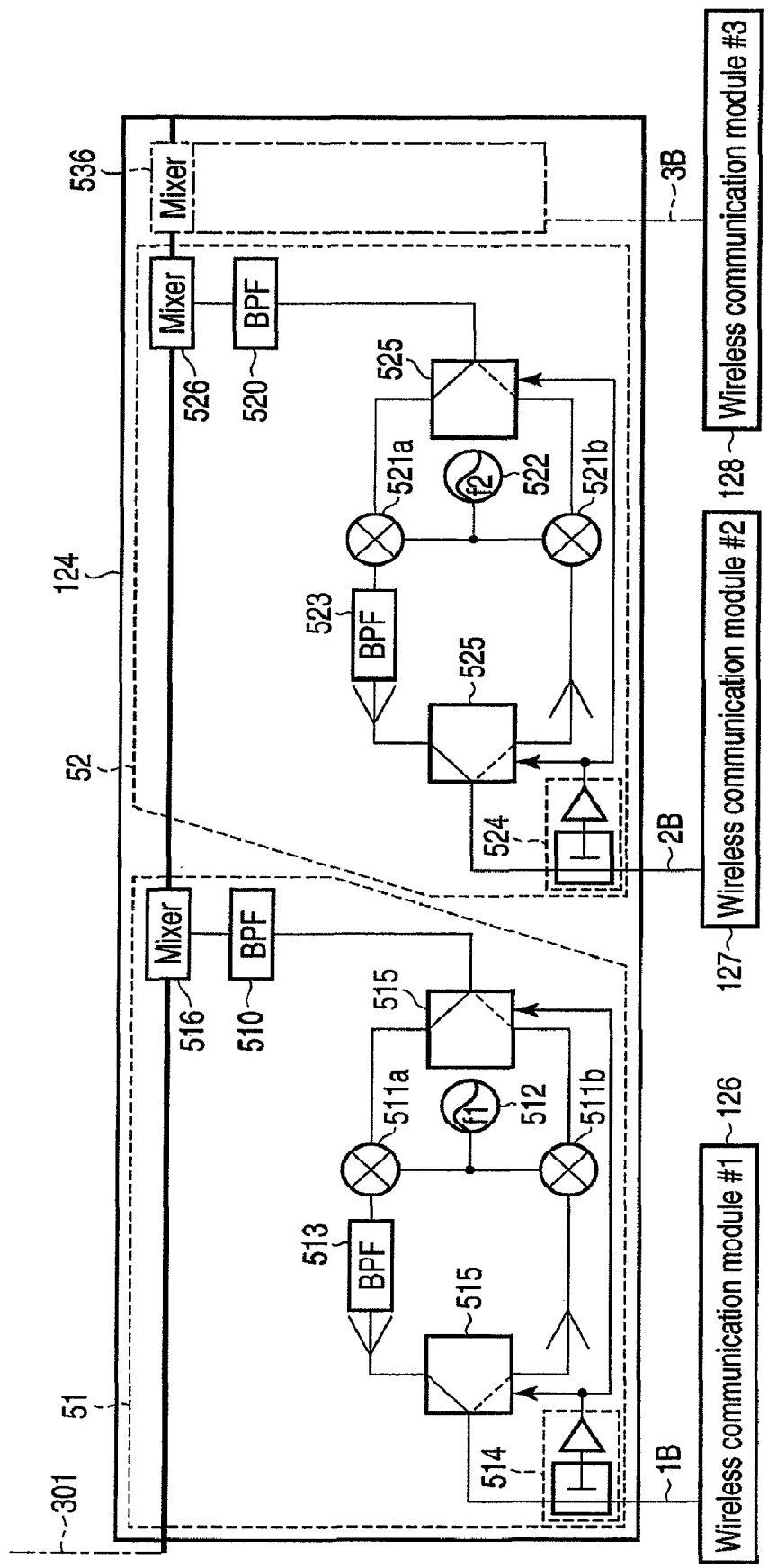
FIG. 7 is an exemplary circuit diagram showing another mixing/distributing device which is provided in the information processing apparatus according to the embodiment.

FIG. 6 and FIG. 7 show, respectively, a circuit which constitutes the mixing/distributing device 123 on the display unit 12 side, and a circuit which constitutes the mixing/distributing device 124 on the computer main body 11 side.

In the mixing/distributing device 123 on the display unit 12 side, which is shown in FIG. 6, a signal processing circuit, which executes frequency conversion, mixing, distribution and amplification for signals, is provided in association with each wireless sub-system comprising a wireless communication module and an associated antenna. FIG. 6 shows an example of two signal processing circuits corresponding to two wireless sub-systems. In the case where there is an additional sub-system, a similar signal processing module circuit corresponding to the additional wireless sub-system is further provided.

A description below is given of the circuit which executes frequency conversion, mixing, distribution and amplification for signals, by referring to a signal processing module circuit 41 shown in FIG. 6. The circuit 41 executes a process for a transmission/reception signal by the wireless sub-system comprising the wireless communication module 126 and antenna 1.

The circuit 41 comprises band-pass filters (BPF) 410a, 410b and 414, amplifiers 411a and 411b, a sensor 416, frequency converters 412a and 412b, a voltage-controlled oscillator (VCO) 413, a mixer 415 and two switches 417.

The band-pass filter (BPF) 410a, amplifier 411a and frequency converter 412a function as a reception circuit. This reception circuit has a function of converting a reception signal of a frequency band of Bluetooth (BT), which is input from the antenna 1, to the above-described reception signal of the frequency band of 2200 to 2290 MHz. The band-pass filter (BPF) 410b, amplifier 411b and frequency converter 412b function as a transmission circuit. This transmission circuit has a function of converting a transmission signal of a frequency band of 2200 to 2290 MHz, which is input from the cable 301, to a transmission signal of the frequency band of Bluetooth (BT).

Of the two switches 417, the switch 417 that is positioned on the antenna 1 side is a switch which couples one of the reception circuit and transmission circuit to the antenna 1. The other switch 417 is a switch which couples one of the reception circuit and transmission circuit to the cable 301.

The sensor 416 detects the intensity of the transmission signal of 2200 to 2290 MHz which is input from the cable 301. In the case where the detected intensity is higher than a predetermined value, the sensor 416 controls the two switches 417, thereby switching the circuit, which is to be coupled to each of the antenna 1 and cable 301, from the reception circuit to the transmission circuit.

Next, a concrete example of the operation of the circuit 41 is described.

To begin with, in the case where the mixed transmission signal is input from the cable 301, that is, in the case where the signal, in which the transmission signals from the plural wireless sub-systems are mixed by the mixing/distributing device 124 on the computer main body 11 side, is input, the BPF extracts from the mixed transmission signal the transmission signal of the target frequency component (2200 to 2290 MHz) which is to be processed by the circuit 41.

If the extracted transmission signal is input to the switch 417, the switches 417 change over the connection of the circuit from the reception side (the upper side in FIG. 6) to the transmission side (the lower side in FIG. 6). This change-over is affected by making use of such characteristics that the signal intensity of the transmission signal is higher than the signal intensity of the reception signal. Specifically, the sensor 416 observes the signal intensity of the transmission signal (specifically, the signal intensity of the signal of the frequency band of 2200 to 2290 MHz, which is input/output between the circuit 41 and the cable 301). For example, if the sensor 416 detects that the signal intensity is higher than a predetermined threshold value, the two switches 417 changes over the circuit connection from the reception side to the transmission side by a switch change-over signal from the sensor 416.

The frequency converter 412b, as described above, converts the frequency of the transmission signal, which is input via the switch 147, from the intermediate frequency to the radio frequency by using the signal that is input from the VCO 413. As the intermediate frequency, a frequency value at which no interference occurs between the wireless sub-systems is predetermined with respect to each wireless sub-system. Thus, the VCO 413 generates a local oscillation signal of a frequency f1 which corresponds to the value of a predetermined intermediate frequency. Alternatively, by using a PLL (phase locked loop) in place of the VCO 413, the frequency of the local oscillation signal may be determined by the PLL.

The amplifier 411b amplifies the transmission signal which is to be output to the antenna 1. Specifically, the amplifier 411 amplifies the frequency-converted transmission signal, thereby to correct a cable loss that is an attenuation at the time of transmitting the signal via the cable.

The BPF 401b extracts the transmission signal of a necessary frequency component from the amplified transmission signal. In short, the BPF 410b cuts the signal of an unnecessary frequency component from the amplified transmission signal.

By the above-described process, the mixing/distributing device 123 can generate the transmission signal of the necessary frequency for the transmission by the antenna 1 from the mixed transmission signal that is input from the cable 301, and can output the generated transmission signal to the antenna 1. After the end of the above-described process, each switch 417 is changed over from the transmission side to the reception side. In the normal state, each switch 417 is connected to the reception side.

Next, the process for the reception signal is described.

In the case where the reception signal is input from the antenna 1 via the cable 1A, the reception signal flows through the switch 417 that is in the state in which the switch 417 is connected to the reception side (the upper side in FIG. 6), and the reception signal is input to the BPF 410a. The BPF 410a extracts the reception signal of the necessary frequency component from the reception signal.

The amplifier 411a amplifies the reception signal which is input from the antenna 1. Specifically, the amplifier 411a amplifies the reception signal which has been extracted by the BPF 410a, thereby to correct a cable loss that is an attenuation at the time of transmitting the signal via the cable.

Each of the signal processing circuits 41, 42, . . . , includes amplifiers for amplifying the associated transmission signal and reception signal. The amplification factors of these amplifiers differ between the signal processing circuits 41, 42, . . . . In each signal processing circuit, the amplification factor for the transmission/reception signal is determined in accordance with the total cable length between the wireless communication module and the antenna, which are associated with the signal processing circuit. The distance from the wireless communication module 126, 127, 128 to the mixing/distributing device 123 in the display unit 12 can be made substantially equal. On the other hand, the distance between the mixing/distributing device 123 and the antenna 1, 2, 3, differs from antenna to antenna.

For example, in the example of antenna arrangement shown in FIG. 3, the distance between the mixing/distributing device 123 and the antenna 2 is greater than the distance between the mixing/distributing device 123 and the antenna 1. Accordingly, the cable length of the cable 2A, which connects the mixing/distributing device 123 and the antenna 2, is greater than the cable length of the cable 1A, which connects the mixing/distributing device 123 and the antenna 1. In this case, the amplification factor of each of the amplifiers 421a and 421b, which are provided in the signal processing circuit 42, is set to be higher than the amplification factor of each of the amplifiers 411a and 411b, which are provided in the signal processing circuit 41.

As has been described above, the frequency converter 412a in the signal processing circuit 41 shown in FIG. 6 converts the frequency of the reception signal, which has been input via the switch 417, from the radio frequency to the intermediate frequency by using the signal that is input from the VCO 413. As the intermediate frequency, a frequency value at which no interference occurs between the wireless sub-systems is predetermined with respect to each wireless sub-system. Thus, the VCO 413 generates a local oscillation signal of a frequency f1 which corresponds to the value of a predetermined intermediate frequency. Alternatively, by using a PLL in place of the VCO 413, the frequency may be determined by the PLL.

The mixer 415 mixes the frequency-converted reception signal and a reception signal which has been processed by another circuit, such as the circuit 42, and outputs the mixed reception signal to the single cable 301.

By the above-described process, the mixing/distributing device 123 can generate the reception signal of the necessary frequency for the transmission via the cable 301 from the reception signal that is input from the antenna 1, and can output the generated reception signal to the cable 301.

In FIG. 6, the circuit 42 and circuits for other additional wireless sub-systems execute the same process as has been described above, with respect to the input transmission/reception signals. Specifically, each of the circuit 42 and circuits for other additional wireless sub-systems has the same circuit structure as the circuit 41.

Similarly, in the mixing/distributing device 124 on the computer main body 11 side, which is shown in FIG. 7, a signal processing circuit, which executes frequency conversion, mixing, distribution and amplification for signals, is provided in association with each wireless sub-system comprising a wireless communication module and an associated antenna. FIG. 7 shows an example of two signal processing circuits corresponding to two wireless sub-systems. In the case where there is an additional sub-system, a similar circuit corresponding to the additional wireless sub-system is further provided. Thus, the mixing/distributing device 123 on the display unit 12 side can distribute the mixed transmission signal, which is input from the single cable 301, to the plural antennas, and can mix the reception signals, which are input from the plural antennas, and output the mixed reception signal to the single cable 301.

A description below is given of the circuit which executes frequency conversion, mixing, distribution and amplification for signals, by referring to a signal processing circuit 51 shown in FIG. 7. The circuit 51 executes a process for a transmission/reception signal by the wireless sub-system comprising the wireless communication module 126 and antenna 1.

The circuit 51 comprises band-pass filters (BPF) 510 and 513, a sensor 514, frequency converters 511a and 511b, a voltage-controlled oscillator (VCO) 512, a mixer 516 and two switches 515. The frequency converter 511a and the band-pass filter (BPF) 510 function as a reception circuit. This reception circuit has a function of converting the above-described reception signal of the frequency band of 2200 to 2290 MHz, which is input from the cable 301, to the transmission signal of the frequency band of Bluetooth (BT). The frequency converter 511b is provided in the transmission circuit which outputs the transmission signal of the frequency band of Bluetooth (BT), which is output from the wireless communication module 126, to the cable 301. Of the two switches 515, the switch 515 that is positioned on the cable 301 side is a switch which couples one of the reception circuit and transmission circuit to the cable 301. The other switch 515 is a switch which couples one of the reception circuit and transmission circuit to the wireless communication module 126.

The sensor 514 detects the intensity of the transmission signal from the wireless communication module 126. In the case where the detected intensity is higher than a predetermined value, the sensor 514 controls the two switches 515, thereby changing over the circuit, which is to be coupled to each of the cable 301 and wireless communication module 126, from the reception circuit to the transmission circuit.

Next, a concrete example of the operation of the circuit 51 is described.

To begin with, in the case where the transmission signal is input from the wireless communication module 126 via the cable 1B, the switches 515 change over the circuit connection from the reception side (the upper side in FIG. 7) to the transmission side (the lower side in FIG. 7). This change-over is affected by making use of such characteristics that the signal intensity of the transmission signal is higher than the signal intensity of the reception signal. Specifically, the sensor 514 observes the signal intensity of the transmission signal (specifically, the signal intensity of the signal of the frequency band of 2400 to 2490 MHz, which is input/output between the wireless communication module 126 and the circuit 51). For example, if the sensor 514 detects that the signal intensity is higher than a predetermined threshold value, the two switches 515 change over the circuit connection from the reception side to the transmission side by a switch change-over signal from the sensor 514.

The frequency converter 511b, as described above, converts the frequency of the transmission signal, which is input via the switch 515, from the radio frequency to the intermediate frequency by using the signal that is input from the VCO 512. As the intermediate frequency, a frequency value at which no interference occurs between the wireless sub-systems is predetermined with respect to each wireless sub-system. Thus, the VCO 512 generates a signal of a frequency f1 which corresponds to the value of a predetermined intermediate frequency. Alternatively, by using a PLL in place of the VCO 512, the frequency may be determined by the PLL.

The mixer 516 mixes the frequency-converted transmission signal and a transmission signal which has been processed by another circuit, such as the circuit 52, and outputs the mixed transmission signal to the single cable 301.

By the above-described process, the mixing/distributing device 124 can generate the transmission signal of the necessary frequency for the transmission via the cable 301 from the transmission signal that is input from the wireless communication module 126, and can output the generated transmission signal to the cable 301. After the end of the above-described process, each switch 515 is changed over from the transmission side to the reception side.

Next, in the case where the mixed reception signal is input from the cable 301, that is, in the case where the signal, in which the reception signals from the plural wireless sub-systems are mixed by the mixing/distributing device 123 on the display unit 12 side, is input, the BPF 510 extracts the reception signal of the frequency component which is to be processed by the circuit 51. The extracted reception signal flows through the switch 515 that is in the state in which the switch 515 is connected to the reception side (the upper side in FIG. 7), and the reception signal is input to the frequency converter 511a.

The frequency converter 511a, as described above, converts the frequency of the reception signal, which is input via the switch 515, from the intermediate frequency to the radio frequency by using the signal that is input from the VCO 512. As the intermediate frequency, a frequency value at which no interference occurs between the wireless sub-systems is predetermined with respect to each wireless sub-system. Thus, the VCO 512 generates a signal of a frequency f1 which corresponds to the value of a predetermined intermediate frequency. Alternatively, by using a PLL in place of the VCO 512, the frequency may be determined by the PLL.

The BPF 513 extracts the reception signal of the necessary frequency component from the frequency-converted reception signal, and outputs the extracted reception signal to the wireless communication module 126.

By the above-described process, the mixing/distributing device 124 can generate the reception signal having the frequency, which is to be input to the wireless communication module 126, from the mixed reception signal which is input from the cable 301, and can output the generated reception signal to the wireless communication module 126.

In FIG. 7, the circuit 52 and circuits for other additional wireless sub-systems execute the same process as has been described above, with respect to the input transmission/reception signals. Thus, the mixing/distributing device 124 on the computer main body 11 side can mix the transmission signals that are input from the plural wireless communication modules, and can output the mixed transmission signal to the single cable 301. In addition, the mixing/distributing device 124 can distribute the mixed reception signal, which is input from the single cable 301, to the plural wireless communication modules.

As has been described above, the transmission/reception signals of the plural wireless sub-systems (wireless communication modules and associated antennas) can simultaneously be transmitted via the single cable 301 which connects the mixing/distributing device 123 on the display unit 12 side and the mixing/distributing device 124 on the computer main body 11 side. Usually, the cable for transmitting a signal needs to be provided for each of wireless sub-systems. The number of wireless sub-systems, which can be mounted in the personal computer 10, may possibly be limited by the number of cables which can be passed through the hinge portion 18. In the present embodiment, by using the single cable that is passed through the hinge portion 18, many wireless sub-systems can be mounted in the personal computer 10. In addition, since the number of cables is one, the size of the hinge portion 18 itself can be reduced. Moreover, the possibility of breakage of the cable in the vicinity of the hinge portion 18 can be reduced.

In the mixing/distributing device 123 and mixing/distributing device 124, as described above, the process of converting the transmission signals and reception signals from the radio frequencies to the intermediate frequencies is executed in order to transmit the plural transmission signals and reception signals via only one cable 301. This frequency conversion process aims at avoiding interference between the signals. Thus, if the radio frequencies of the respective signals have values at which no interference occurs, the signals of the radio frequencies may directly be transmitted, without executing the frequency conversion process. For example, use may be made of such a method that two interfering signals of three signals are converted from the radio frequencies to the intermediate frequencies, and the other of the three signals, which has the radio frequency, is directly transmitted. In the mixing/distributing device 123 and mixing/distributing device 124, the transmission circuit which processes the transmission signal and the reception circuit which processes the reception signal are changed over by using the signal intensity which is observed by the sensor 416, 515. Thereby, the transmission/reception signal can be transmitted via the single cable, without requiring control by, e.g. the wireless communication module, which is provided outside the mixing/distributing device 123 and mixing/distributing device 124.

Furthermore, in the mixing/distributing device 123 and mixing/distributing device 124, as described above, the cable loss, which is the attenuation at the time of transmitting a signal via a cable, is corrected. By correcting the signal attenuation due to the cable loss, the communication performance (transmission/reception performance) based on the communication coverage distance and reception sensitivity can be improved. Therefore, even in the case where the cable length is large, the target performance can be achieved, and a carrier authentication test, or the like, can be passed. Furthermore, regardless of the cable length, the wireless communication module and antenna can freely be disposed in the computer main body 11 and display unit 12.

Figure 8:
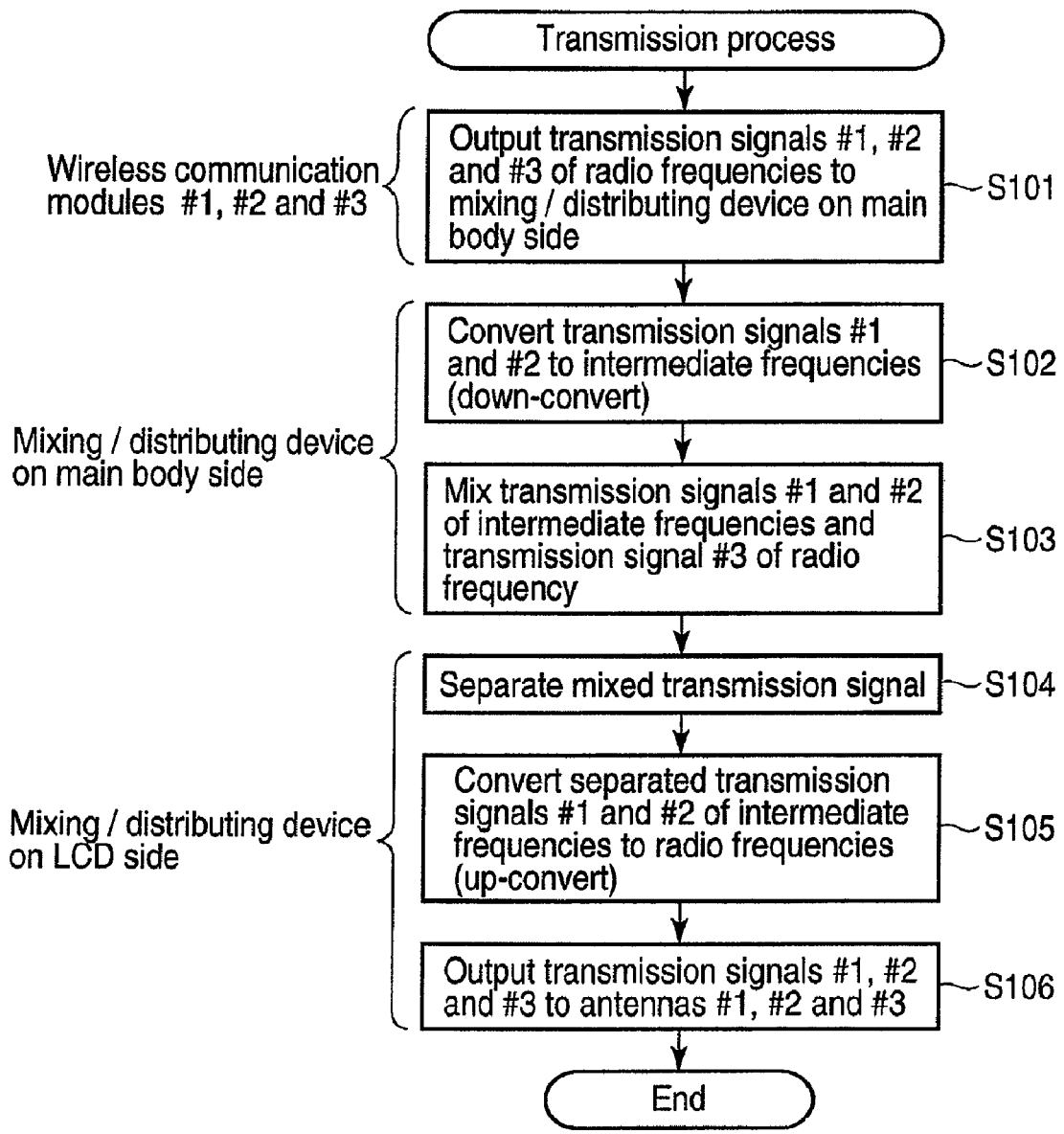
FIG. 8 is an exemplary flow chart illustrating the procedure of a transmission process by the information processing apparatus according to the embodiment.

FIG. 8 is a flow chart illustrating the procedure of the transmission process in the case where the radio-frequency signal is transmitted from the wireless communication module.

To start with, wireless communication modules #1, #2 and #3 (126, 127, 128) output a transmission signal #1, a transmission signal #2 and a transmission signal #3, which have radio frequencies, to the mixing/distributing device 124 on the computer main body 11 side (block S101). The radio frequency, in this context, refers to the frequency of a signal which is used in a wireless communication system of each wireless sub-system comprising the wireless communication module and the associated antenna.

Subsequently, the mixing/distributing device 124 on the computer main body 11 side converts the radio frequencies of the transmission signals #1 and #2 to intermediate frequencies (block S102). Since the transmission signal #1, transmission signal #2 and transmission signal #3 have radio frequencies of mutually overlapping frequency bands, the transmission signals #1 and #2 are converted from the radio frequencies to the intermediate frequencies, thereby avoiding overlapping of frequencies of the three transmission signals. Thus, the three transmission signals can simultaneously be transmitted via the single cable.

The mixing/distributing device 124 on the computer main body 11 side mixes the frequency-converted transmission signals #1 and #2 of the intermediate frequencies and the transmission signal #3 of the radio frequency (block S103). The mixed transmission signal is output to the cable 301 and is transmitted to the mixing/distributing device 123 on the display unit 12 side.

The mixing/distributing device 123 on the display unit 12 side separates the mixed transmission signal (block S104). Specifically, the mixing/distributing device 123 on the display unit 12 side extracts, from the mixed transmission signal, the transmission signals #1 and #2 of the intermediate frequencies and the transmission signal #3 of the radio frequency. The mixing/distributing device 123 on the display unit 12 side converts the intermediate-frequency transmission signals #1 and #2 of the extracted transmission signals to the radio-frequency transmission signals (block S105). The mixing/distributing device 123 outputs the transmission signal #1, transmission signal #2 and transmission signal #3, which have the radio frequencies, to the antenna #1 (1), antenna #2 (2) and antenna #3 (3), respectively (block S106).

By the above-described process, the transmission signals of the radio frequencies, which have been output from the plural wireless communication modules, can be transmitted via the single cable to the antennas that are associated with the respective wireless communication modules.

Figure 9:
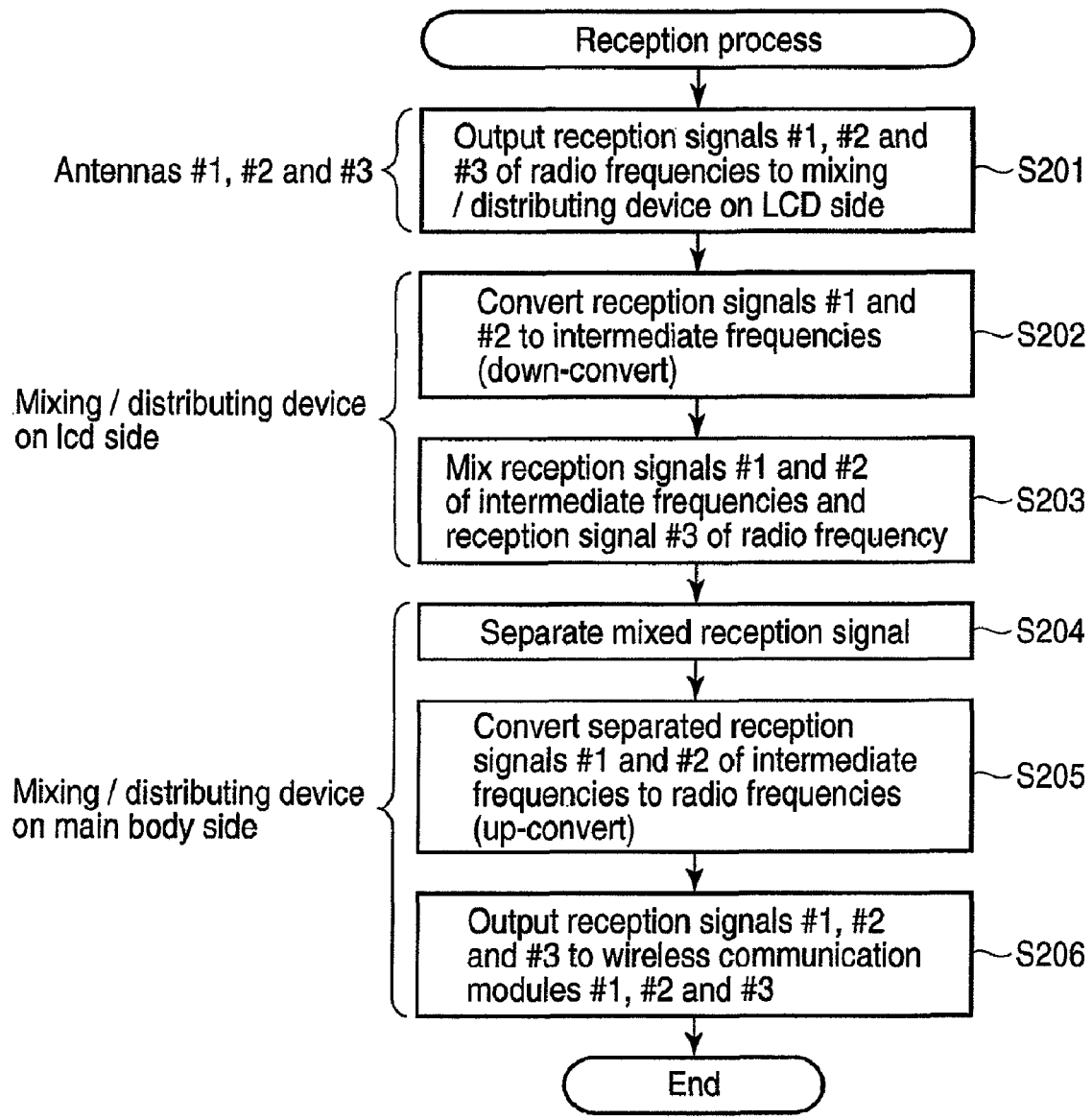
FIG. 9 is an exemplary flow chart illustrating the procedure of a reception process by the information processing apparatus according to the embodiment.

FIG. 9 is a flow chart illustrating the procedure of the reception process in the case where the radio-frequency signal is received from the antenna.

To start with, the antenna #1, antenna #2 and antenna #3 output a reception signal #1, a reception signal #2 and a reception signal #3, which have radio frequencies, to the mixing/distributing device 123 on the display unit 12 side (block S201).

Subsequently, the mixing/distributing device 123 on the display unit 12 side converts the radio frequencies of the reception signals #1 and #2 to intermediate frequencies (block S202). Since the reception signal #1, reception signal #2 and reception signal #3 have radio frequencies of mutually overlapping frequency bands, the reception signals #1 and #2 are converted from the radio frequencies to the intermediate frequencies, thereby avoiding overlapping of frequencies of the three reception signals. Thus, the three reception signals can simultaneously be transmitted via the single cable.

The mixing/distributing device 123 on the display unit 12 side mixes the frequency-converted reception signals #1 and #2 of the intermediate frequencies and the reception signal #3 of the radio frequency (block S203). The mixed reception signal is output to the cable 301 and is transmitted to the mixing/distributing device 124 on the computer main body 11 side.

The mixing/distributing device 124 on the computer main body 11 side separates the mixed reception signal (block S204). Specifically, the mixing/distributing device 124 on the computer main body 11 side extracts, from the mixed reception signal, the reception signals #1 and #2 of the intermediate frequencies and the reception signal #3 of the radio frequency. The mixing/distributing device 124 on the computer main body 11 side converts the intermediate-frequency reception signals #1 and #2 of the extracted reception signals to the radio-frequency reception signals (block S205). The mixing/distributing device 124 outputs the reception signal #1, reception signal #2 and reception signal #3, which have the radio frequencies, to the wireless communication module #1, wireless communication module #2 and wireless communication module #3, respectively (block S206).

By the above-described process, the reception signals of the radio frequencies, which have been received by the plural antennas, can be transmitted via the single cable to the wireless communication modules that are associated with the respective antennas.

Figure 10:
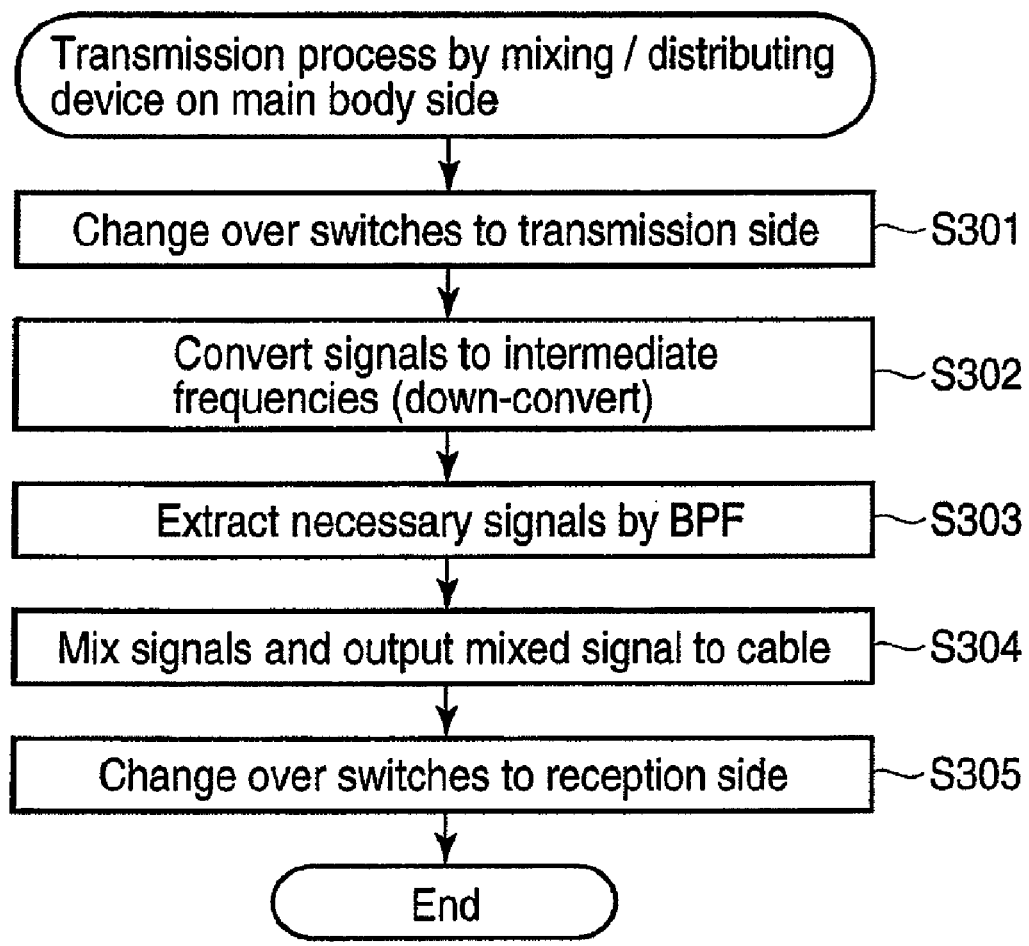
FIG. 10 is an exemplary flow chart illustrating the procedure of a transmission process by a computer-main-body-side mixing/distributing device which is provided in the information processing apparatus according to the embodiment.

Referring now to flow charts of FIG. 10 and FIG. 11, a description is given of the procedures of the processes by the mixing/distributing device 124 on the computer main body 11 side and the mixing/distributing device 123 on the display unit 12 side in the procedure of the transmission process illustrated in the flow chart of FIG. 8.

FIG. 10 is a flow chart illustrating the procedure of the transmission process by the mixing/distributing device 124 on the computer main body 11 side.

To start with, if transmission signals of radio frequencies are input from the wireless communication modules to the mixing/distributing device 124, the mixing/distributing device 124 changes over the switches to the transmission side (block S301). Specifically, the mixing/distributing device 124 changes over the circuit connection from the circuit for executing the reception process to the circuit for executing the transmission process.

Subsequently, the mixing/distributing device 124 converts the radio frequencies of the transmission signals, which are input from the respective wireless communication modules, to intermediate frequencies (block S302). The BPF that is provided in the mixing/distributing device 124 extracts the signal of the necessary frequency component from the frequency-converted transmission signal of the intermediate frequency (block S303). The mixing/distributing device 124 mixes the transmission signals corresponding to the respective wireless communication modules, and outputs the mixed transmission signal to the cable 301 (block S304).

If the process on the transmission signals that are input to the mixing/distributing device 124 is completed, the mixing/distributing device 124 changes over the switches from the transmission side to the reception side (block S305).

FIG. 11 is a flow chart illustrating the procedure of the transmission process by the mixing/distributing device 123 on the display unit 12 side.

To start with, the BPF that is provided in the mixing/distributing device 123 extracts the signal of the necessary frequency component from the mixed transmission signal which is input from the cable 301 (block S401). If the transmission signal of the intermediate frequency is input from the cable 301, the mixing/distributing device 123 changes over the switches to the transmission side (block S402). Specifically, the mixing/distributing device 123 changes over the circuit connection from the circuit for executing the reception process to the circuit for executing the transmission process.

The mixing/distributing device 123 converts the extracted transmission signal of the intermediate frequency to the wireless frequency (block S403). The amplifier provided in the mixing/distributing device 123 amplifies the transmission signal, thereby to correct the cable loss of the transmission signal (block S404). Another BPF provided in the mixing/distributing device 123 extracts the signal of the necessary frequency component from the amplified transmission signal (block S405). The mixing/distributing device 123 outputs the extracted transmission signal to the antenna (block S406).

If the process on the transmission signal that is input to the mixing/distributing device 123 is completed, the mixing/distributing device 123 changes over the switches from the transmission side to the reception side (block S407).

Figure 12:
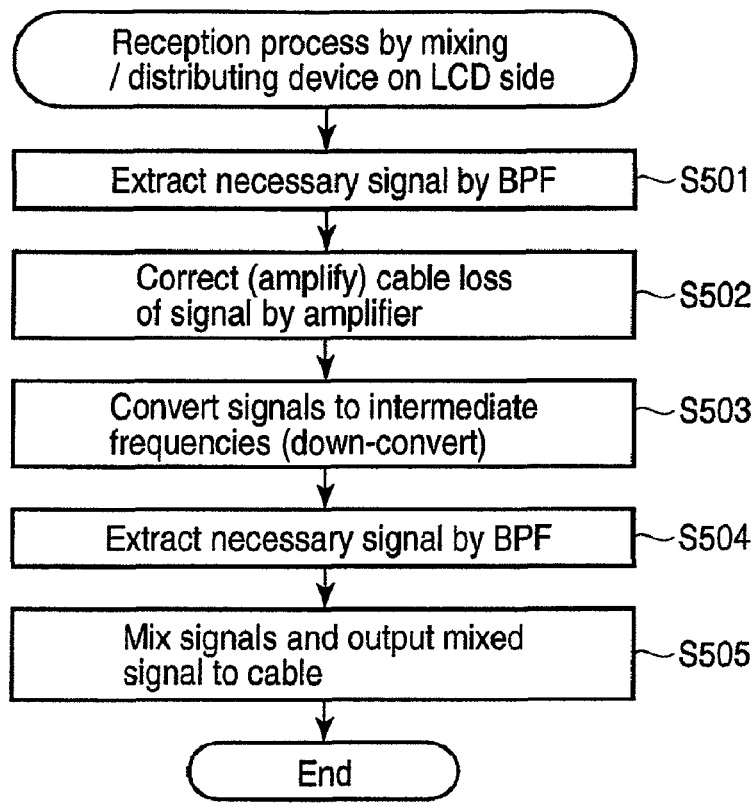
FIG. 12 is an exemplary flow chart illustrating the procedure of a reception process by the LCD-side mixing/distributing device which is provided in the information processing apparatus according to the embodiment.
Figure 13:
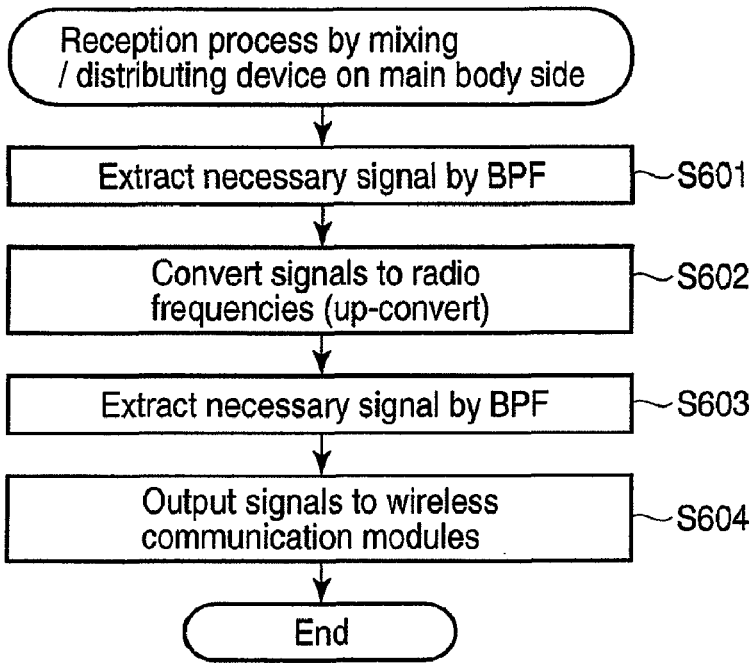
FIG. 13 is an exemplary flow chart illustrating the procedure of a reception process by the computer-main-body-side mixing/distributing device which is provided in the information processing apparatus according to the embodiment.

Referring now to flow charts of FIG. 12 and FIG. 13, a description is given of the procedures of the processes by the mixing/distributing device 123 on the display unit 12 side and the mixing/distributing device 124 on the computer main body 11 side in the procedure of the reception process illustrated in the flow chart of FIG. 9.

FIG. 12 is a flow chart illustrating the procedure of the reception process by the mixing/distributing device 123 on the display unit 12 side.

To start with, the BPF that is provided in the mixing/distributing device 123 extracts the signal of the necessary frequency component from the reception signal of the radio frequency which is input from the antenna (block S501). Then, the amplifier provided in the mixing/distributing device 123 amplifies the extracted reception signal, thereby to correct the cable loss of the extracted reception signal (block S502). The mixing/distributing device 123 converts the amplified reception signal from the radio frequency to the intermediate frequency (block S503).

Another BPF provided in the mixing/distributing device 123 extracts the signal of the necessary frequency component from the converted reception signal (block S504). The mixing/distributing device 123 mixes the reception signals corresponding to the respective antennas, and outputs the mixed reception signal to the cable 301 (block S505).

FIG. 13 is a flow chart illustrating the procedure of the reception process by the mixing/distributing device 124 on the computer main body 11 side.

To start with, the BPF that is provided in the mixing/distributing device 124 extracts the signal of the necessary frequency component from the mixed reception signal which is input from the cable 301 (block S601). Then, the mixing/distributing device 124 converts the extracted reception signal from the intermediate frequency to the radio frequency (block S602). Another BPF provided in the mixing/distributing device 124 extracts the signal of the necessary frequency component from the converted reception signal (block S603). The mixing/distributing device 124 outputs the extracted reception signals to the associated wireless communication modules (block S604).

As has been described above, according to the present embodiment, the transmission/reception signals by the plural kinds of wireless communication systems can simultaneously be transmitted via the single cable. The transmission/reception signals by the plural kinds of wireless communication systems are mixed/distributed by the two mixing/distributing devices which are provided at both ends of the cable. One of the two mixing/distributing devices converts the plural signals of radio frequencies, which are input from the wireless communication modules or the antennas, to the intermediate frequencies of non-overlapping frequency bands, and outputs the converted signals to the cable. The other mixing/distributing device separates the mixed intermediate-frequency signal which is input from the cable, converts the separated intermediate-frequency signals to the radio-frequency signals, and outputs the converted signals to the wireless communication modules or the antennas. Therefore, without adding new functions to the wireless communication modules and antennas, the transmission/reception signals can simultaneously be transmitted via the single cable. In the case where the frequency bands of the transmission/reception signals of radio frequencies do not overlap, the mixing/distributing device may mix and transmit the radio-frequency transmission/reception signals as such, without converting the radio-frequency transmission/reception signals to intermediate-frequency transmission/reception signals. Even in the case where the frequency bands of the transmission/reception signals of radio frequencies overlap, it is not necessary for the mixing/distributing device to convert all transmission/reception signals to intermediate-frequency transmission/reception signals. For example, in the case where there are three kinds of signals having overlapping frequency bands, if overlapping of frequency bands can be avoided by converting two of the three signals to intermediate-frequency signals, the other signal with the radio frequency may be mixed and transmitted as such.

The frequency conversion of the radio-frequency signals may be either down-convert or up-convert if the overlap of frequency bands of the radio signals can be avoided. Specifically, in the transmission process of FIG. 8, the down-convert in block S102 may be replaced with up-convert, and the up-convert in block S105 may be replaced with down-convert. Similarly, in the reception process of FIG. 9, the down-convert in block S202 may be replaced with up-convert, and the up-convert in block S205 may be replaced with down-convert. For example, in the case where there are three kinds of signals having overlapping frequency bands, one of the three signals may be down-converted and another signal may be up-converted, thereby to avoid overlap of frequency bands between the three signals, and the three signals may be mixed and transmitted, with the other signal remaining as the radio-frequency signal.

The mixing/distributing device has the function of amplifying the signal intensity of the transmission/reception signal, and can correct the attenuation of the transmission/reception signal due to the transmission via the cable. This is applicable not only to the case of correcting the intensity of the transmission/reception signal between different kinds of wireless communication systems, but also to the case of correcting the reception signals between two antennas of the same wireless communication system, which are provided at the time of communication by a diversity system. Specifically, antennas in stabler radio states can correctly be selected by correcting the attenuation of reception signals, which occurs because the total cable length for connection from two antennas to a wireless communication module varies from antenna to antenna.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
   a main body;
   a display unit rotatably attached to the main body via a coupling portion;
   a first antenna provided in the display unit;
   a second antenna provided in the display unit;
   a first wireless communication module provided in the main body, the first wireless communication module being configured to receive a signal of a first frequency band;
   a second wireless communication module provided in the main body, the second wireless communication module being configured to receive a signal of a third frequency band;
   a first mixing and distributing device provided in the display unit, and configured to convert a reception signal of the first frequency band, which is input from the first antenna, to a reception signal of a second frequency band, which does not overlap the third frequency band, and to output the reception signal of the second frequency band and a reception signal of the third frequency band, which is input from the second antenna, to a cable which is inserted in the coupling portion; and
   a second mixing and distributing device provided in the main body, and configured to receive from the cable the reception signal of the second frequency band and the reception signal of the third frequency band, to convert the received reception signal of the second frequency band to a reception signal of the first frequency band, to output the reception signal of the first frequency band to the first wireless communication module, and to output the received reception signal of the third frequency band to the second wireless communication module.

2. The information processing apparatus of claim 1, wherein at least a portion of the third frequency band overlaps the first frequency band.

3. The information processing apparatus of claim 1,
   wherein the first mixing and distributing device is configured to convert the reception signal of the third frequency band to a reception signal of a fourth frequency band, and to output the reception signal of the fourth frequency band to the cable, and
   wherein the second mixing and distributing device is configured to receive from the cable the reception signal of the fourth frequency band, to convert the received reception signal of the fourth frequency band to a reception signal of the third frequency band, and to output the reception signal of the third frequency band to the second wireless communication module.

4. The information processing apparatus of claim 3, wherein at least a portion of the third frequency band overlaps the first frequency band, and the second frequency band and the fourth frequency band are set to be predetermined frequency bands which do not overlap with each other.

5. An information processing apparatus comprising:
   a main body;
   a display unit rotatably attached to the main body via a coupling portion;
   a first antenna provided in the display unit;
   a second antenna provided in the display unit;
   a first wireless communication module provided in the main body, the first wireless communication module being configured to transmit a signal of a first frequency band;
   a second wireless communication module provided in the main body, the second wireless communication module being configured to transmit a signal of a third frequency band;
   a first mixing and distributing device provided in the display unit; and
   a second mixing and distributing device provided in the main body,
   wherein the second mixing and distributing device is configured to convert a transmission signal of the first frequency band, which is input from the first wireless communication module, to a transmission signal of a second frequency band, which does not overlap the third frequency band, to output the transmission signal of the second frequency band and a transmission signal of the third frequency band, which is input from the second wireless communication module, to a cable which is inserted in the coupling portion, and
   wherein the first mixing and distributing device is configured to receive from the cable the transmission signal of the second frequency band and the transmission signal of the third frequency band, to convert the received transmission signal of the second frequency band to a transmission signal of the first frequency band, to output the transmission signal of the first frequency band to the first antenna, and to output the received transmission signal of the third frequency band to the second antenna.

6. The information processing apparatus of claim 5, wherein at least a portion of the third frequency band overlaps the first frequency band.

7. The information processing apparatus of claim 5,
wherein the first mixing and distributing device is configured to receive from the cable a transmission signal of the fourth frequency band, to convert the received transmission signal of the fourth frequency band to a transmission signal of a third frequency band, and to output the transmission signal of the third frequency band to the second antenna, and wherein the second mixing and distributing device is configured to convert the transmission signal of the third frequency band which is input from the second wireless communication module to a transmission signal of the fourth frequency band, and to output to the cable the transmission signal of the fourth frequency band.

8. The information processing apparatus of claim 7, wherein at least a portion of the third frequency band overlaps the first frequency band, and the second frequency band and the fourth frequency band are set to be predetermined frequency bands which do not overlap with each other.

* * * * *